United States Patent
Sina et al.

(10) Patent No.: US 10,421,161 B2
(45) Date of Patent: Sep. 24, 2019

(54) HIGH QUALITY, VOID AND INCLUSION FREE ALLOY WIRE

(71) Applicant: Honeywell International Inc., Morris Plains, NJ (US)

(72) Inventors: Younes Sina, Spokane, WA (US); David E. Steele, Spokane, WA (US); Ira G. Nolander, Spokane, WA (US); Erik L. Turner, Spokane, WA (US)

(73) Assignee: Honeywell International Inc., Morris Plains, NJ (US)

( * ) Notice: Subject to any disclaimer, the term of this patent is extended or adjusted under 35 U.S.C. 154(b) by 271 days.

(21) Appl. No.: 15/495,375

(22) Filed: Apr. 24, 2017

(65) Prior Publication Data
US 2017/0320172 A1    Nov. 9, 2017

Related U.S. Application Data
(60) Provisional application No. 62/332,922, filed on May 6, 2016.

(51) Int. Cl.
| | |
|---|---|
| *B22D 11/00* | (2006.01) |
| *B21C 1/00* | (2006.01) |
| *B21C 37/04* | (2006.01) |
| *B23K 35/40* | (2006.01) |
| *C22C 1/03* | (2006.01) |
| *B23K 35/26* | (2006.01) |
| *C22C 11/00* | (2006.01) |
| *B23K 35/02* | (2006.01) |
| *B23K 101/40* | (2006.01) |

(52) U.S. Cl.
CPC ............. *B23K 35/40* (2013.01); *B21C 1/003* (2013.01); *B21C 37/047* (2013.01); *B23K 35/0222* (2013.01); *B23K 35/0227* (2013.01); *B23K 35/268* (2013.01); *C22C 1/03* (2013.01); *C22C 11/00* (2013.01); *B23K 2101/40* (2018.08)

(58) Field of Classification Search
CPC ..... B22D 11/005; B21C 1/003; B21C 37/047; C22C 1/03; B23K 35/40
USPC .......................................... 164/462; 420/590
See application file for complete search history.

(56) References Cited

U.S. PATENT DOCUMENTS
| | | |
|---|---|---|
| 4,524,241 A | 6/1985 | Binder et al. |
| 4,592,538 A | 6/1986 | Wells et al. |
| 4,608,230 A | 8/1986 | DiMartini et al. |
| 5,226,946 A | 7/1993 | Diehm et al. |

(Continued)

FOREIGN PATENT DOCUMENTS
| | | |
|---|---|---|
| CN | 102642096 A | 8/2012 |
| CN | 102848098 A | 1/2013 |

(Continued)

OTHER PUBLICATIONS
International Search Report and Written Opinion issued in PCT/US2017/029604, dated Jul. 25, 2017, 13 pages.

*Primary Examiner* — Kevin P Kerns
(74) *Attorney, Agent, or Firm* — Faegre Baker Daniels LLP

(57) ABSTRACT

Disclosed herein is a method of forming an alloy material for use in a wire. The method includes forming a master alloy containing lead and silver; and creating a molten wire alloy by combining the master alloy, additional lead, and a third material in a vessel. The method also includes flowing argon gas through and over the molten wire alloy. The method also includes drawing the molten alloy from the vessel through an actively cooled die, and solidifying the molten wire alloy to form a bar of wire alloy.

17 Claims, 12 Drawing Sheets

(56) References Cited

U.S. PATENT DOCUMENTS

2006/0231171 A1 10/2006 Davis et al.
2016/0053346 A1 2/2016 Szuromi et al.

FOREIGN PATENT DOCUMENTS

| CN | 104070303 A | 10/2014 |
| JP | 60181249 A2 | 9/1985 |
| JP | 60196285 A2 | 10/1985 |
| WO | WO0162419 A1 | 8/2001 |
| WO | 2005027198 A2 | 3/2005 |

HIGH QUALITY, VOID AND INCLUSION FREE ALLOY WIRE

CROSS REFERENCE TO RELATED APPLICATION

This application claims priority to U.S. Provisional Patent Application Ser. No. 62/332,922, entitled "HIGH QUALITY, VOID AND INCLUSION FREE ALLOY WIRE," filed May 6, 2016, the entire disclosure of which is expressly incorporated herein by reference.

TECHNICAL FIELD

The instant disclosure relates to metals and metal alloys for use in making wires. More particularly, the instant disclosure relates to methods of forming metals and metal alloys into wires.

BACKGROUND

Fine wires, also known as bonding wires, are commonly used in integrated circuit applications for connecting an electrode on a semiconductor element to an external terminal. For example, suitable fine wires may have a wire diameter of approximately 0.020 inches (0.508 micrometers) to 0.080 inches (2.032 micrometers). Bonding wires may be bonded using a thermal compressive bonding technique. For example, a leading edge of a bonding wire may be heated to form a ball by surface tension. The ball may then be compressively bonded on an electrode of a semiconductor element. Thereafter, the bonding wire can be directly bonded to an external lead by, for example, a wedge bond.

Suitable bonding wires may be made of lead (Pb) or lead alloys. Lead bonding wires have a low material cost and excellent electrical conductivity. However, oxidation of the lead bonding wire typically reduces bonding strength.

Fine wires made from metal or metal alloys are manufactured to tight tolerances to ensure uniformity in the composition and material properties of the fine wire. Metal or metal alloy wires are often prone to defects such discontinuities, material segregation, or material gradients. One problem that can occur during the manufacture of wires is formation of discontinuities within the material that forms the wire. Examples of discontinuities include voids, blisters, cracks, and changes in porosity throughout a material, as well as solid inclusions or impurities. Discontinuities in a wire can lead to wire breakage during further processing, transportation or handling of the wire. If the wire is to be used as a solder, solid inclusions such as impurities can result in particles of the impurities being deposited onto the solder.

Open air casting using vertical book molds may lead to voids being formed in the alloy due to solidification in the molds. Alloy wires that contain voids or inclusions often result in sparking or spitting issues when the wire is later used, for example when used to solder electrodes of a semiconductor element. Alloy wires that contain voids or inclusions have a tendency to break at the location of the void or inclusion. Frequent wire breakage leads to lower production yields.

Additionally, segregation within the metal alloy may lead to localized changes in the concentration of individual components of the cast metal alloy and may occur along the length of the wire, radially or in both directions. Localized differences in concentration can lead to weakening of the fine wire. Segregation or non-uniform concentrations of individual components of the cast metal alloy may also result in material property gradients. Because individual components may have different material properties, such as melt temperatures or the coefficient of thermal expansion, identical process parameters may lead to inconsistent effects on various parts of a fine wire, making suitable processing parameters difficult to predict.

There is thus a need for a method of forming an alloy wire that is substantially free of voids, inclusions, and segregation.

SUMMARY

Disclosed herein is a method of forming an alloy material for use in a wire. The method includes forming a master alloy containing lead and silver; and creating a molten wire alloy by combining the master alloy, additional lead, and a third material in a vessel. The method also includes flowing argon gas through and over the molten wire alloy. The method also includes drawing the molten alloy from the vessel through an actively cooled die, and solidifying the molten wire alloy to form a bar of wire alloy.

Also disclosed herein is a method of forming an alloy for use in a wire. The method includes selecting a first metal having first melting point and a second metal having a second melting point. The method also includes melting the first and second metals; and combining the first and second metals to form a master alloy having a melting point of from about 460° C. to about 650° C. The method further includes forming a molten wire alloy by combining the master alloy with a third metal and an additional amount of at least one of the first metal and second metal, and mixing the molten wire alloy in a vessel containing argon gas. The method further includes cooling the molten wire alloy while drawing the molten wire alloy through a die to form a wire alloy bar.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
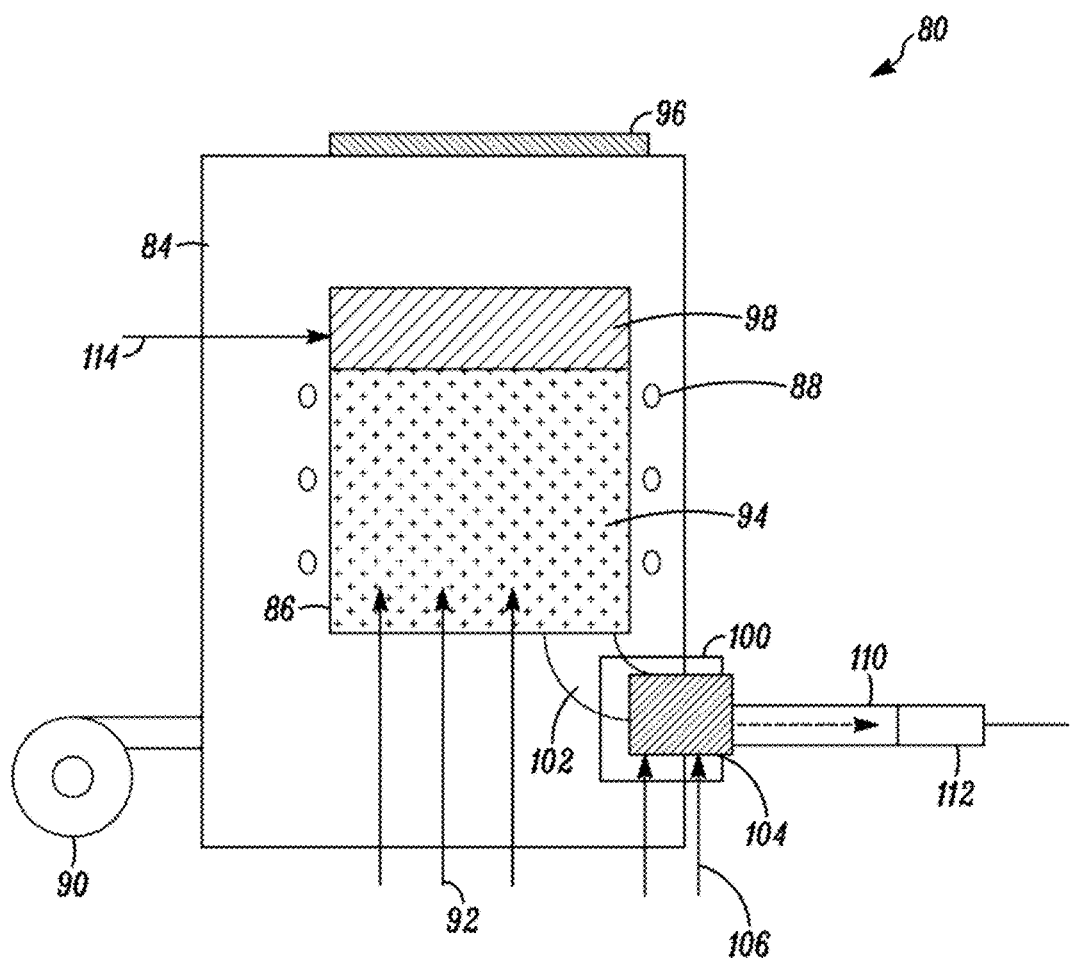
FIG. 1 is a schematic diagram of a continuous casting machine that may be used in the methods of the instant disclosure.

Disclosed herein is a method of forming a metal alloy wire having a uniform alloy composition throughout the wire material. A metal wire formed using the methods disclosed herein may be substantially free of voids, blisters and inclusions. A void is a shrinkage cavity produced in casting during solidification. A blister is a shallow blow with a thin film of metal over it appearing on the surface of a cast. Inclusions are nonmetallic materials in the metal alloy matrix. Sources of nonmetallic material include reoxidation, refractories, slag and deoxidization products. A metal wire formed using the methods disclosed herein has greater uniformity and is thus less prone to breaking when compared to metal wires formed using alternative casting methods.

The metal wire formed according to the disclosed methods may also have reduced or no segregation. Segregation or alloy segregation refers to the phenomena wherein individual components of a metal alloy group together within the alloy by type, usually as a result of the primary crystallization of one element with the other element(s) in the remaining liquid. Segregation leads to localized concentration changes within the alloy of the individual components. That is, the individual components of the alloy, i.e. the metals or dopants forming the alloy, gather together to form clusters having localized increased concentration. When segregation occurs, the concentration of the wire alloy components may vary along a length of a wire or from a geometric center of a wire to the outer wire surface. The wire may have any cross sectional shape including circular and non-circular such as polygonal (i.e., triangular, square, rectangular, etc.), oval, or even irregular. The geometric center for a circular cross section will be the radial center and otherwise, for any regular polygon, oval, or irregular cross section, the geometric center will be the centroid of the cross section. Thus, the concentration of the wire alloy components may vary along length and the cross-section of the wire.

As described herein, an alloy wire having reduced breakage and that is substantially free of voids, inclusions and/or segregation may be formed by first forming a master alloy followed by horizontal continuous casting in an inert environment.

In some embodiments, the methods disclosed herein are directed to metal alloys that include lead (Pb), silver (Ag), and tin (Sn) as primary components and may be referred to as Pb/Ag/Sn alloys or PAS alloys, or PAS wire alloy. In some embodiments, the PAS wire alloy contains from 94.0 wt. % to 98.0% Pb or from 95.0 wt. % to 97.0 wt. % Pb, from 1.0 wt. % to 3.5 wt. % Sn or 1.5 wt. % to 3.0 wt. % Ag, and from 0.5 wt. % to 3.0 wt. % Sn or 1.0 wt. % to 2.0 wt. % Sn.

Although PAS alloys are discussed herein, any solder wire alloy can be made using the method described herein. More specifically, the methods disclosed herein may be used for any alloy that is used for solder wire that has sensitivity to voids, inclusions, segregation, and blisters. For example, the methods disclosed herein may be used to form solder alloys that include lead, tin, silver, indium, antimony, copper, phosphorus, aluminum, bismuth, gold, silicon, tellurium, germanium and combinations thereof.

In some embodiments, the methods disclosed herein are directed to a metal alloy that is doped. In some embodiments, suitable dopants may be added to the PAS alloy to reduce the affinity of the PAS alloy metal components for oxygen, and thus reduce the production of metal oxides. Oxygen affinity is a measure of an element's or compound's preference to bond to oxygen. The oxygen affinity of an element is a physical property available in references such as the CRC Handbook of Chemistry and Physics. Suitable dopants may have an oxygen affinity higher than that of either lead, tin, or silver for the purposes discussed below. Example suitable dopants include, but are not limited to, phosphorus, calcium, and aluminum. A PAS wire alloy may contain about 200 ppm or less of the dopant, or, in other embodiments, may contain about 100 ppm or less of the dopant, or, in still other embodiments about 50 ppm or less of the dopant. A combination of any two or more of the foregoing dopants is also possible, for example, the wire may include phosphorus and calcium, with the amount of total dopant as set forth above. In some embodiments, P may be added to a PAS wire alloy in an amount of about 50.0 parts per million (ppm).

FIG. 1 is a schematic figure of a casting system 80 that may be used with certain embodiments of the methods disclosed herein for horizontal casting of the wire alloy. As shown in FIG. 1, a casting system 80 may include a casting chamber 84 that is constructed to withstand pressure changes within the casting chamber 84. The casting chamber 84 may also include additional equipment connected to or within the casting chamber 84 that are used to process a wire alloy. For example, a casting chamber 84 may include a crucible 86 that is used to hold the wire alloy 94 during casting. The crucible 86 may be constructed to withstand high temperatures needed to melt the wire alloy components. The crucible 86 may also be constructed from material that will inhibit oxide formation in the wire alloy 94. Some examples of suitable crucible materials include graphite, quartz, and ceramic. The crucible 86 may also include heating elements 88 to provide thermal energy to the crucible 86 and its contents. The heating elements 88 may be used to melt the contents of the crucible 86. For example, the components of the wire alloy 94, including the master alloy, and any other metals or dopants to be included in the wire alloy 94 may be placed into the crucible 86 and then melted.

As shown in FIG. 1, the casting system 80 may also include a vacuum pump 90 attached to the casting chamber 84. The vacuum pump 90 may be used to remove gases from the casting chamber 84 before and/or during a casting process. The casting system 80 may also have gas inputs 92 to provide particular gases to the inside of the casting chamber 84. The gas inputs 92 may be connected to the inside of the crucible 86 to carry gases into the material contained within crucible 86. For example, the components to form the wire alloy may be placed into the crucible 86 as a solid or liquid, the casting chamber 84 may be sealed by closing a door 96. Once the casting chamber door 96 is closed, the vacuum pump 90 may remove any gas that is inside the casting chamber 84 to create a vacuum within the chamber 84. If the wire alloy components in the crucible 86 are solids, the heating elements 88 may melt the components and maintain the wire alloy components as a melt 94 throughout the casting process.

Using the gas inputs 92, inert gas may be introduced into the molten wire alloy 94 during the casting process by bubbling the gas up through the molten wire alloy 94 in the crucible 86. The inert gas chosen may be one that is heavier than air in order to form a layer 98 of inert gas above the molten wire alloy 94 after bubbling up through the molten wire alloy 94. For example, once the wire alloy 94 is molten, an inert gas may be bubbled up through the molten wire alloy 94 and allowed to gather in the chamber 84 and form a layer 98 above the molten wire alloy 94. Having the inert gas bubble up through the molten wire alloy 94 can also be used to stir the molten wire alloy 94 throughout the casting process. Stirring the molten wire alloy 94 may help prevent segregation during casting by preventing the molten wire alloy 94 from settling into areas having localized concentration differences. Other benefits include that the inert gas that is bubbled through the molten wire alloy 94 drives oxygen out and replaces oxygen inside of the casting chamber 84. Removing oxygen from the casting chamber 84 further prevents the molten wire alloy 94 from oxidizing during the casting process. Preventing oxidation while the wire alloy 94 is being cast inhibits the formation of oxide impurities, and thus prevents inclusions from forming in the solidified wire alloy. In some embodiments, there may be more than one gas input for introducing inert gas into the casting chamber 84. For example, gas inputs 92 may introduce inert gas into the bottom of the crucible 86 used for mixing or through the die 100, and a second gas input 114 may be used to introduce inert gas into the top of the casting chamber 84 to act as a cover gas for reducing oxygen reaction. Some examples of inert gases that may be used include any noble gas that is heavier than air. In some embodiments, argon (Ar) may be suitable because of the relative cost and it is heavier than air.

The molten wire alloy 94 is cast by drawing a portion of the molten wire alloy 94 through a die 100. The casting chamber 84 may include a chute 102 connecting the crucible 86 to the die 100. The die 100 may include a cooling zone 104 that cools and solidifies the molten wire alloy 94 before it exits the die 100. In the cooling zone 104, cooling fluid 106 is circulated to draw heat from the molten wire alloy 94 to cool the molten wire alloy below the solidification temperature. The cooling fluid 106 circulated through the die 100 provides active cooling to the die 100 and the cooling zone 104. The cooling fluid 106 withdraws heat from the die 100 and the wire alloy within the die 100; thus the die 100 is actively cooled by the cooling fluid 106. To start the drawing, a draw bar 112 may be placed at the die 100 and used to pull the initial portion of solid wire alloy through the die 100 in the direction shown by the arrow 110. Once the initial portion of solid wire alloy is drawn through the die 100, the die 100 is back filled with molten wire alloy flowing from the crucible 86 through the chute 102, which then also solidifies in the cooling zone 104 and is drawn out through the die 100 by pulling the previously formed solid wire alloy. By continuously pulling the solidified wire alloy out of the die 100, more molten wire alloy is drawn through the die 100 where it also solidifies and can be drawn. This process is carried out continuously to form a solid wire alloy bar. For example, the drawing process is continued at a uniform speed until a sufficient length solid wire alloy bar is formed. In some embodiments, the drawing speed is adjusted to match the rate that heat is drawn from the wire alloy to allow the wire to cool at a rate that will create a uniform concentration of the alloy components throughout the wire alloy. For example, the drawing speed may be adjusted to match the cooling rate to create a solid wire alloy bar with a uniform concentration of Pb, Ag, and Sn along a length and along a diameter of the wire alloy bar. In some embodiments, the drawing process may be performed until the molten wire alloy 94 is consumed. The die 100 can be shaped to produce a wire alloy bar with a circular cross sectional shape, though any cross sectional shape such as a square or rectangle may also be formed.

In some embodiments, the die 100 uses water as a cooling fluid 106. As the molten wire alloy exits the crucible 86 it is rapidly cooled forming a solid. This solid wire alloy is then pulled out of the die 100 by drawing. The drawing speed is controllable and may be changed to a suitable speed for certain alloys. The cooling rate is set by the flow rate of the cooling fluid 106. The draw speed and length are also controllable. For example, the solid wire alloy may be drawn from the die 100 to form a bar. In some embodiments, the bar may be drawn out a distance, after which there is delay followed by the bar being drawn about another, followed by a delay. This cycle may repeat itself until all the wire alloy in the casting chamber 84 is withdrawn. By allowing a delay time between each draw, the solidification rate may be controlled to allow potential voids to fill in with molten wire alloy before the next draw. This method of continuously casting and drawing while allowing potential void locations to fill in provides a suitable solidification rate that inhibits segregation and void formation. Continuous casting inhibits segregation by solidifying the wire alloy while it is well mixed yet also prevents void formation by allowing suitable time for voids to fill in. For example, the bar may be drawn out a distance of about 0.20 to 0.30 inches, after which there is about a 5 second delay followed by the bar being drawn about another 0.20 to 0.30 inches, followed by another 5 second delay.

Figure 2:
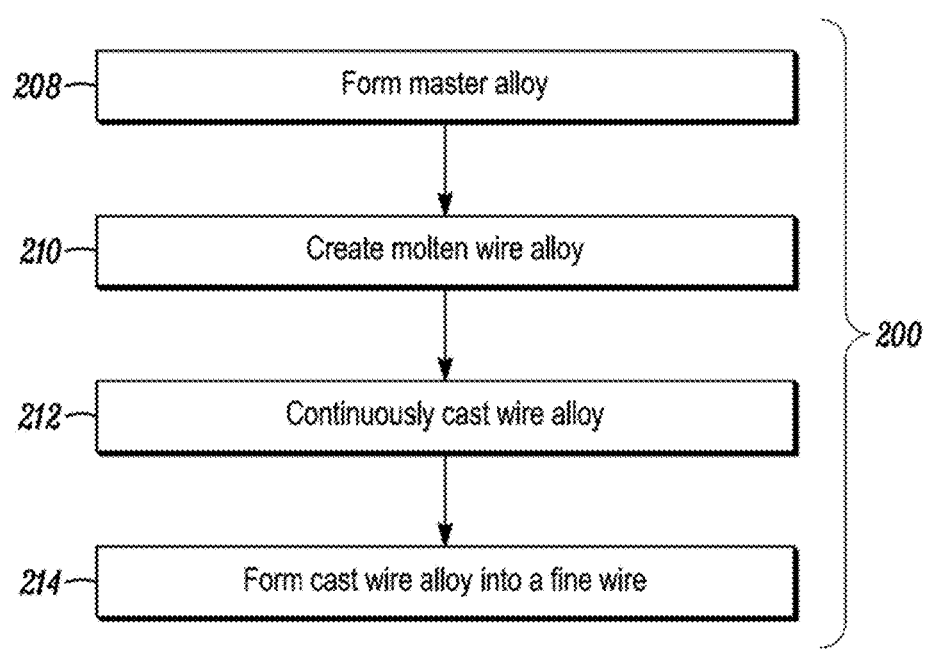
FIG. 2 is a flow diagram showing the method of the instant disclosure, according to some embodiments.

FIG. 2 is a flow diagram showing an embodiment of the method 200 of forming a PAS alloy wire. The first step 208 is to form a master alloy. The master alloy is created by combining at least a portion of two components of wire alloy. In some examples, the two components of the master alloy may be components that have the highest concentration in the wire alloy. Additionally or alternatively, the two components chosen for the master alloy may be components of the wire alloy that have the largest difference in melting points. In the embodiment described below, the two components used for illustration are Ag and Pb.

Figure 3:
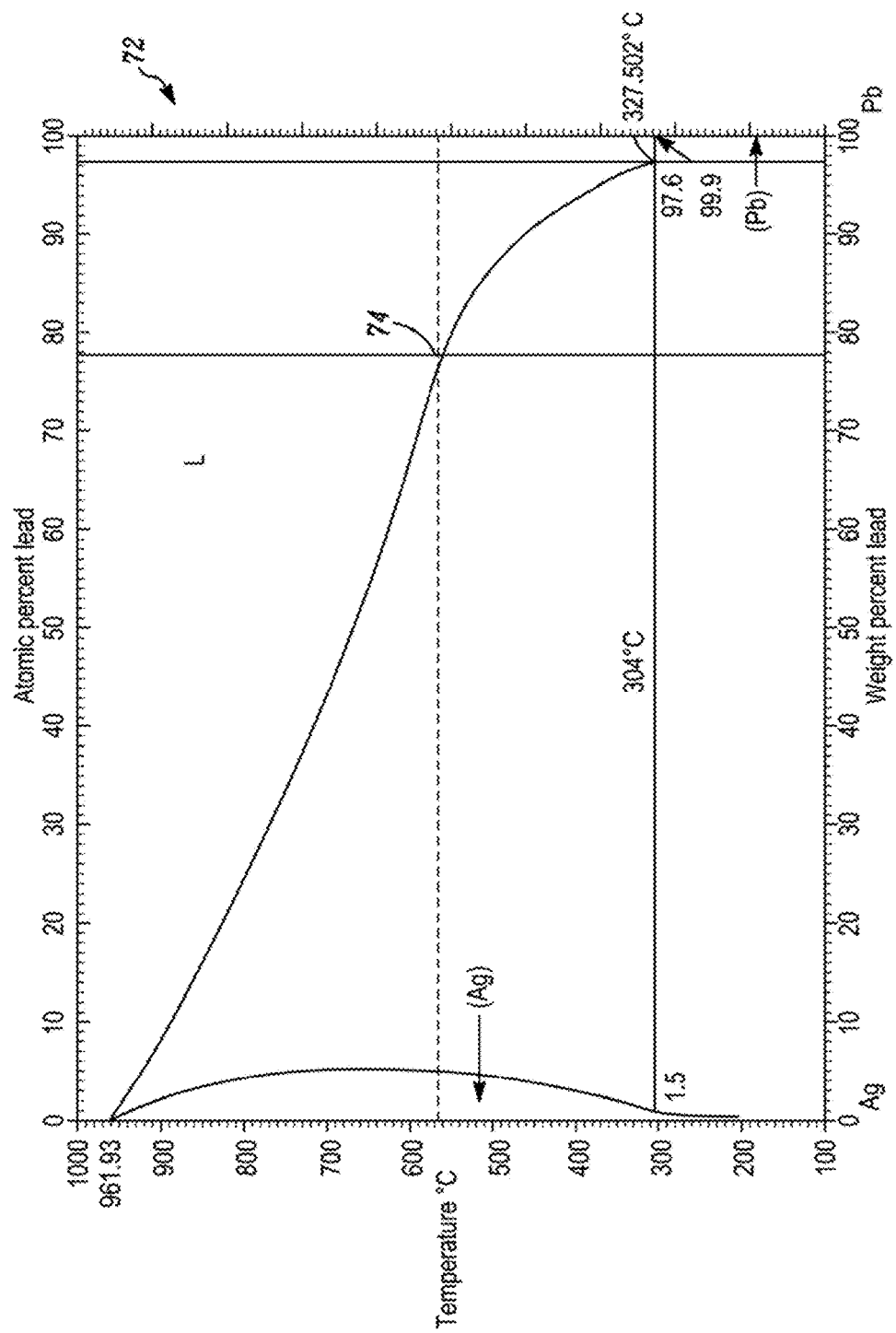
FIG. 3 is a phase diagram for a lead and silver system.
Figure 7:
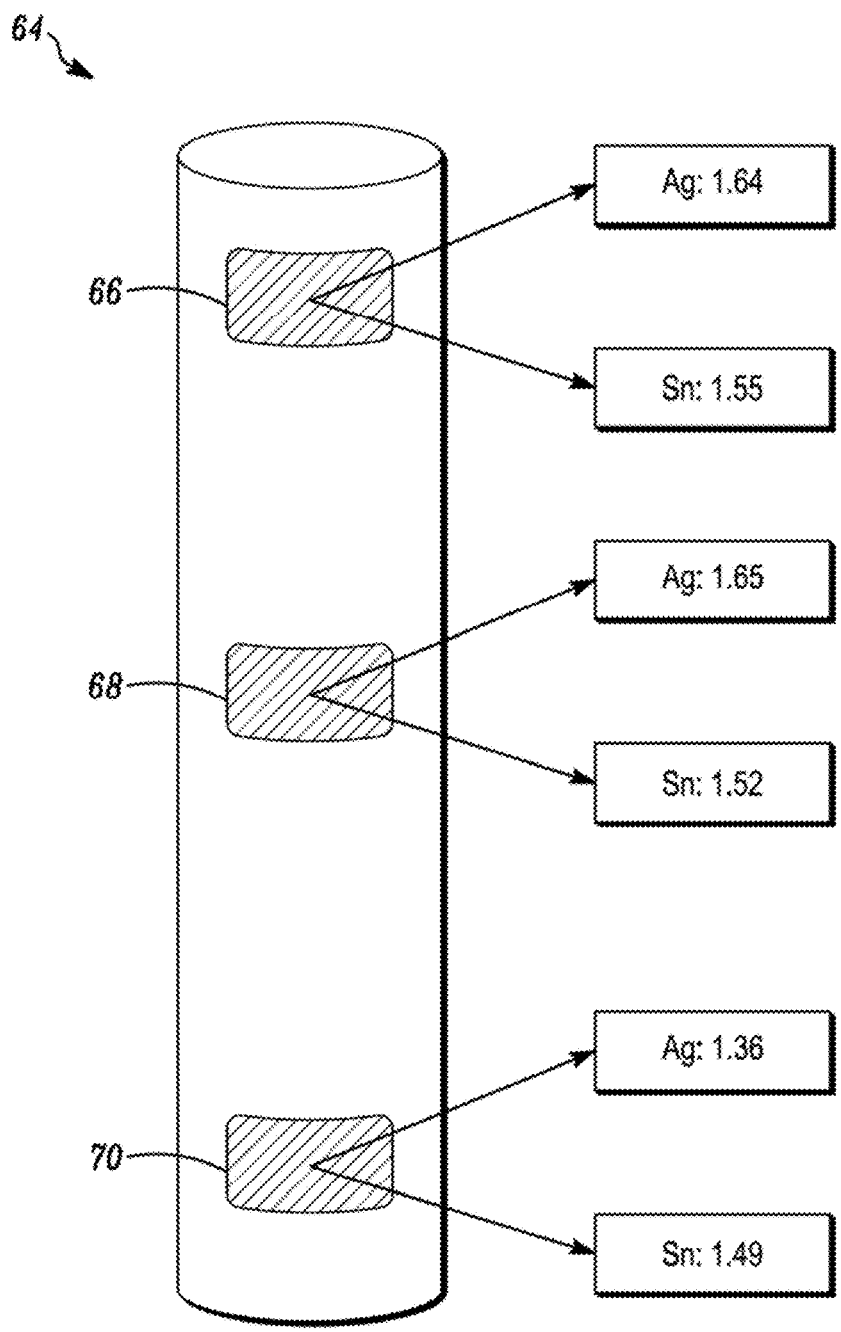
FIG. 7 is a schematic of a wire alloy bar formed using known methods.

In some embodiments, the ratio of the two components that form the master alloy may be chosen using a phase diagram of the two component mixture. FIG. 3 shows a phase diagram 72 for an Ag/Pb mixture. The selected ratio may, for example, be chosen based on a particular melting point. For example, the ratio may be chosen by selecting a ratio that has a melting point about halfway to the melting point for the alloy component with the higher melting point. The choice of what ratio to use also represents a balance between choosing a lower melting point, and other factors. For example, in the Ag/Pb phase diagram there is a drop off of melt temperature towards the Pb side of the diagram. However, using a master alloy that has a high concentration of Pb may lead to higher lead oxides being formed. In this example, Ag has a higher melting point, at about 961.8° C. Referring to FIG. 7, the Ag/Pb phase diagram shows the point 64 that is chosen for example purposes, namely a composition that has a melting point about half of the 961.8° C., which was chosen to be a ratio having a melting point about 550° C. At this point 74 the weight percentage of Ag to Pb is approximately 78 wt. % to 22 wt. % respectively. For example, a master alloy may contain Pb from 60.0 wt. % to 90.0 wt. %, from 70.0 wt. % to 80.0 wt. %, or from 72.0 wt. % to 78.0 wt. % and any value within this range. A master alloy may contain Ag from 40.0 wt. % to 10.0 wt. %, from 30.0 wt. % to 20.0 wt. %, or from 28.0 wt. % to 22.0 wt. %, and any value within this range. Master alloys formed with weight percentages within these ranges will have melting points from about 460° C. to about 650° C.

In some embodiments, all of the highest melting point component in the wire alloy, in this case Ag, may be added to the master alloy. The highest melting point component may be mixed with the bulk metal used for the wire alloy, i.e. the component that forms the highest weight percentage in the wire alloy. For example, in a PAS alloy, Ag has the highest melting point, thus all of the Ag that will be added to the wire alloy is first added to the master alloy. And Pb is used to form the master alloy in this example because Pb is the bulk component of the final alloy.

Forming the master alloy first later aids with forming wire alloys that are made up of components having large differences in melting points. The composition of the master alloy is designed to lower the melting point of the master alloy to be about half the melting point of the highest melting point component. In some embodiments, one criteria for selecting candidates for forming the master alloy is choosing two elements that have a melting point difference greater than 25%. For example, in the master alloy for the PAS alloy, Ag has melting point of 961° C. and Pb has a melting point of 327° C. In some embodiments, Sn and Ag may be used to form the master alloy. The melting point difference between Ag and Sn would also be greater than 25% because Ag has melting point of 961° C. and Sn has a melting point of 231° C. Thus a master alloy made of Sn and Ag will have a melting point between 231° C. and 961° C. depending on the weight ratio of Sn to Ag in the master alloy. However, Pb may be more suitable for creating the master alloy for forming a PAS wire alloy as Pb is present in higher weight percentage in the PAS wire alloy.

The components of the master alloy are co-melted under vacuum using vacuum induction melting (VIM). Because the master alloy components have different melting points, when the two components are mixed, the master alloy component having a higher melting point may solidify when mixed with the molten component having a lower melting point. For example, in the Pb/Ag mixture, Pb is molten at about 327° C. and Ag is molten at about 961° C. Because Pb is molten at a lower temperature than Ag, when the two are mixed, the Ag will cool and solidify. However, if mixed properly, the Ag will disburse throughout the molten Pb before fully solidifying. The resulting master alloy having Ag and Pb will have a lower melting point than the pure Ag. Once molten, the melt may optionally be degassed with an inert gas, such as argon (Ar). After degassing, the melt may be allowed to solidify in the crucible. For example, the master alloy may be allowed to solidify to form master alloy casts having a particular size or shape for easier handling. Solidification of the master alloy in the crucible is referred to as a "non-pour" casting process. Pouring the alloy into a mold is referred to as a "pour" casting process. In some pour casting methods, a suitable number of molds are placed on a table, which is located in the same vacuum chamber as the crucible. To transfer the molten master alloy to the mold, the crucible is tipped such that the alloy flows into a mold under vacuum. The solidified alloy is extracted from the crucible or mold. Alternatively, the master alloy may be transferred to the next step without solidification.

Cooling and solidifying the master alloy may have certain advantages. For example, the solid master alloy may be easier to transport and handle than a molten master alloy. Additionally, when the master alloy is molten, it is more susceptible to oxide formation. Thus, solidifying the master alloy makes it less likely to form oxides during further processing, such as moving the solid master alloy from one casting chamber to the next.

In step 210, a molten wire alloy is created. To create the wire alloy, the master alloy may be placed in a casting chamber, such as casting chamber 84. In addition to the master alloy, other components that will form the wire alloy, including the metals that form the wire alloy, and any additional components such as dopants, are placed within the crucible within the casting chamber. For example, to form a PAS wire alloy the master alloy containing Ag and Pb, may be placed in the casting chamber and Sn added. Additional Pb may also be added to the crucible to increase the Pb wt. % to a suitable percentage for the wire alloy. For example, a master alloy containing Pb from 72.0 wt. % to 78.0 wt. % and Ag from 28.0 wt. % to 22.0 wt. % may be placed within the casting chamber. Sn and additional Pb may then be added to the master alloy in an amount calculated to produce a PAS alloy having from about 94.0 wt. % to 98.0% Pb or from about 95.0 wt. % to 97.0 wt. % Pb, from about 1.0 wt. % to 3.5 wt. % Ag or about 1.5 wt. % to 3.0 wt. % Ag, and from about 0.5 wt. % to 3.0 wt. % Sn or about 1.0 wt. % to 2.0 wt. % Sn. In some embodiments, the wire alloy contains from about 95.5 wt. % to about 97.5 wt. % Pb, from about 1.5 wt. % to about 2.5 wt. % Ag, and from about 1.0 wt. % to about 2.0 wt. % Sn. Suitable dopants that may be added to the PAS wire alloy include phosphorus (P). In some embodiments, P may be added in an amount of from about 50.0 to about 200.0 parts per million (ppm).

The melting temperature of the wire alloy is a function of the melting points of each component, and the weight percent of each component in the wire alloy. For example, the melting point of a master alloy containing 78.0 wt. % Pb and 22.0 wt. % Ag is about 550° C. and the melting point of Sn is about 231.9° C. Therefore, the resulting wire alloy is completely molten at 550° C. In some embodiments, the wire alloy is heated from about 550° C. to about 600° C.

Once the wire alloy is molten, an inert gas may be bubbled through the molten wire alloy to drive off any oxygen and to stir the molten wire alloy to prevent segregation. The inert gas may be allowed to form a layer above the molten wire alloy after bubbling up through the molten wire alloy. For example, an inert gas that is heavier than air may be bubbled up through the molten wire alloy 94 and allowed to gather in the chamber 84 and form a layer 98 above the molten wire alloy 94. The techniques described herein may be particularly suited for creating wire alloys that may form oxides. In particular, providing an inert gas reduces oxide formation by removing oxygen from the casting environment and maintains a reduced oxygen or oxygen free environment throughout the casting process. This technique is advantageous because it allows the casting process to be carried out at elevated temperatures where the wire alloy components may be more susceptible to oxide formation. Using the inert gas in the casting environment allows the casting process to be carried out at temperatures that provide a suitably melted wire alloy, yet prevents the melted wire alloy from contacting oxygen while the wire alloy is being casted.

After forming a fully mixed molten wire alloy, the wire alloy is cast in step 212 by solidifying and continuously drawing it through a die that forms a wire alloy bar. A draw bar may be used to pull an initial portion of solid wire alloy as it solidifies through the die. Once the initial portion of solid wire alloy is drawn through the die, additional molten wire alloy flows from the crucible through the chute. This additional molten alloy also solidifies in the cooling zone and is turn drawn out through the die by pulling the previously formed solid wire alloy. Continuously pulling the solidified wire alloy out of the die allows more molten wire alloy to flow into the die where it also solidifies and can be drawn. This process is carried out continuously to form a solid wire alloy bar.

The wire alloy bar that is formed may be sent for further machining and processing. For example, once the solid wire alloy bar is formed, the bar may be cut into portions of particular length. The solid wire alloy bar may also be machined or polished along the circumference to reduce the diameter of the bar. In some embodiments, in step 214 the solid wire alloy bar is sent through an extruder to create a fine wire. The extruder presses the solid wire alloy bar at high pressure through a die having a particular orifice diameter. The wire alloy bar deforms under the high pressure and passes through the die orifice. The extruder reduces the diameter of the wire alloy bar to form a fine wire that may be the final product. Suitable final diameters for the fine wire may be about 0.050 inches (1.270 micrometers), about 0.030 inches (0.762 micrometers), about 0.020 inches (0.508 micrometers), about 0.010 inches (0.254 micrometers), 0.003 inches about (0.080 micrometers), about 0.001 inches (0.025 micrometers), or less.

Using the methods disclosed herein, an improved alloy wire is created. The casting process described herein results in a fine wire having low or no voids, blisters, inclusions, or segregation.

For example the methods disclosed herein may be used to form fine wires from metal alloys that include lead (Pb), silver (Ag), and tin (Sn) as primary components, also referred to as PAS alloys. Each of these elements may form oxides if exposed to oxygen while the elements are molten. The use of a master alloy enables the casting process to be operated at a lower temperature than the melting temperature of the highest melting point component. Operating the casting process at controlled temperatures reduces the risk of oxide formation during melting in the casting chamber. Reducing the risk of oxide formation allows a user to produce a wire alloy having a lower level of impurities. Additionally, by carrying out the casting step in an inert environment, the risk of oxide formation is further reduced.

Using a master alloy in combination with the continuous casting method also leads to low or no voids, blisters, or inclusions by enabling the molten wire alloy to be cooled to the solid phase at a faster rate. By first creating the master alloy, the wire alloy is molten at a lower temperature than the melting temperature of the highest melting point component, thus the method requires less heat to be drawn from the wire alloy before it solidifies. This results in a shorter cooling time needed to reach the solidification temperature. Therefore, the alloy solidifies faster and smoother, which reduces the risk of forming voids or blisters.

Using a continuous casting process also aids in preventing void formation in the solid wire alloy. The continuous casting process allows the wire alloy to solidify at a controlled rate, which allows potential void locations to fill in with molten wire alloy while the wire alloys is solidifying. The continuous casting method used is not limited to horizontal casting, but may also use vertical casting.

Additionally, the combination of a lower melt temperature, and using a casting method that cools the wire alloy from the liquid phase to the solid phase faster, work in conjunction to allow a fully mixed liquid to be solidified it before it has a chance to segregate. Bubbling the inert gas through the molten wire alloy provides agitation to keep the wire alloy suitably mixed during casting, which results in a uniform or substantially uniform concentration of the alloying components. Using a method that solidifies the molten alloy faster reduces the time that the alloy will have to potentially segregate while it solidifies.

EXAMPLES

The following non-limiting Examples illustrate various features and characteristics of the present invention, which is not to be construed as limited thereto.

Example 1—Continuous Horizontal Casting of PAS Alloy

A master alloy was produced by mixing silver and lead in a vacuum furnace. The master alloy contained 78% lead (Pb) and 22% silver (Ag) by weight and had a melting point of about 550° C. The silver and lead were co-melted together in a crucible.

The master alloy was combined with additional lead and tin to form a wire alloy containing 95.5 wt. % lead, 2.5 wt. % silver and 2.0 wt. % tin in a graphite crucible of a horizontal continuous casting furnace made by Rautomead, Ltd, of Scotland, UK. The Rautomead machine allowed the casting process to be carried out in a closed system filled with argon. Argon was bubbled through the wire alloy melt in the furnace. The bubbling was used to mix the molten wire alloy. Additionally, argon was flowed over the top of the melt to form a protective atmosphere.

The wire alloy was cast by continuously drawing solid wire alloy from the crucible through a graphite die connected to the crucible. The melting point of the PAS wire alloy was 310° C. The wire alloy was molten at the casting temperature of from 500° C. to 720° C. The wire alloy was maintained from 500° C. to 720° C. before being drawn through the die. The solid wire alloy was drawn to form a bar. The bar was drawn out a distance of about 0.20 inches, after which there was a 5 second delay followed by the bar being drawn another 0.20 inches, followed by a delay. This process was repeated to form a wire alloy bar of 1.2 inches in diameter by over 40 inches long. The wire alloy bar was then machined to create a wire alloy bar of 1.0 inches in diameter.

Figure 4:
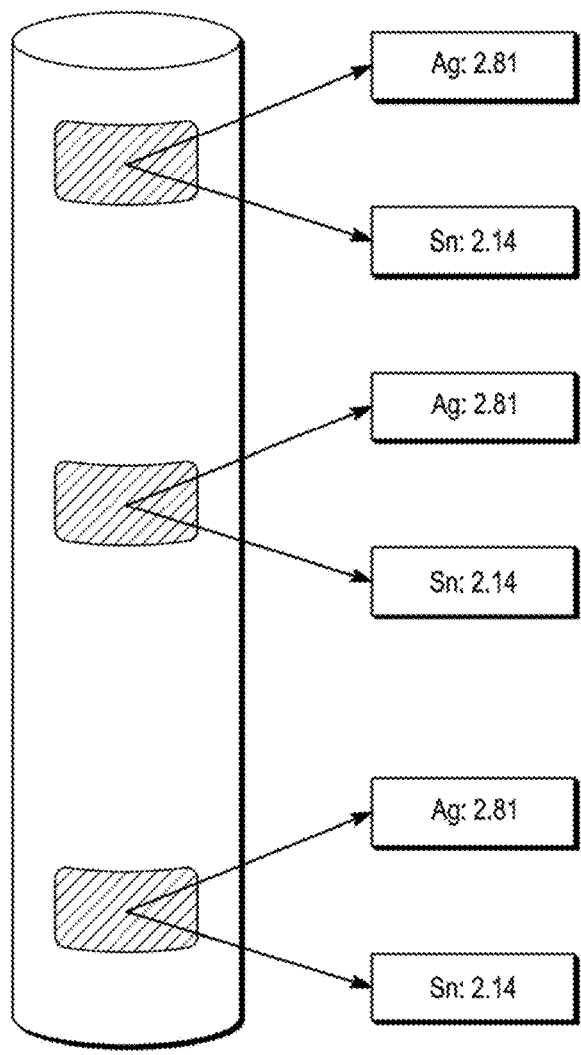
FIG. 4 is a schematic of a wire alloy bar formed using the methods of the instant disclosure.

The wire alloy bar was divided along the length of the bar into discrete portions. The concentration of Ag and Sn was measured at three locations along the length of the wire alloy bar. The results of three concentration tests are shown in FIG. 4. As shown in FIG. 4, the concentration of Ag and Sn did not change along the length of the PAS bar. These data show that the concentration of Ag and Sn was consistent along the length of the bar and there was no segregation. That is the concentration of Ag was the same at all points along the length of the bar, the concentration of Sn was the same at all points along the length of the bar, and the concentration of the remaining element, Pb, was the same at all points along the length of the bar.

The machined wire alloy bar was extruded using a 60 ton horizontal extruder. The extrusion process reduced the cross section of the bar by forcing it through a die. The extrusion step decreased the diameter of the wire alloy from a 1.0 inch diameter bar to a form a fine wire. Fine wires having outer diameters of 20 and 30 mil were extruded and wound onto a spool.

Figure 5:
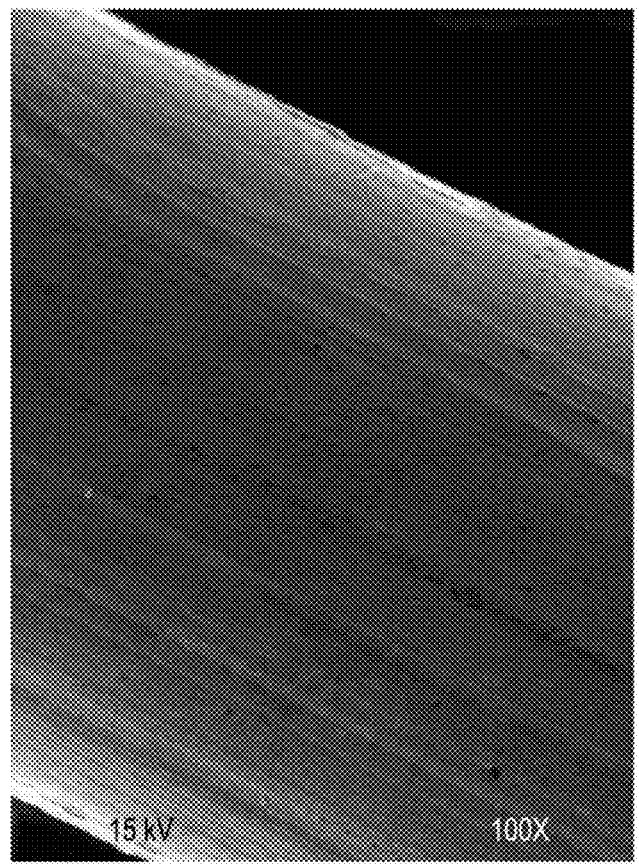
FIG. 5 is a high resolution secondary electron image taken with a scanning electron microscope of a wire formed using the methods of the instant disclosure.
Figure 6:
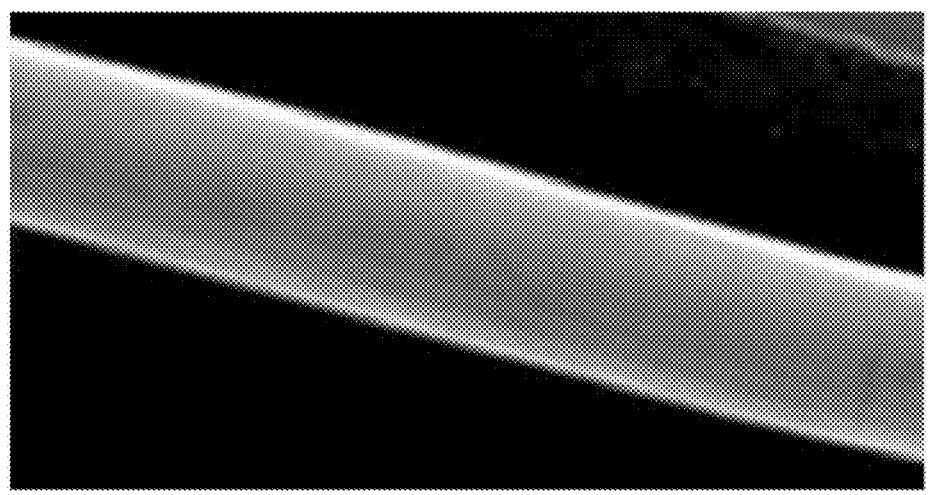
FIG. 6 is a high resolution secondary electron image taken with a scanning electron microscope of a wire formed using the methods of the instant disclosure.

FIGS. 5 and 6 are high resolution secondary election image of the PAS alloy wire taken using a scanning electron microscope. As shown in FIG. 5, the PAS alloy wire formed is substantially free of voids and inclusions. The surface is smooth and even and does not have voids in the surface or blisters projecting from the surface. As shown in FIG. 6, the surface of the PAS alloy wire is substantially smooth and continuous. This example indicates that there are no voids, blisters, or inclusions in the PAS alloy wire. There currently have been no observed breaks in the wire formed using the methods describe above.

Comparative Example—Open Air Casting of PAS Alloy

An alternative method for casting wire alloys that has been previously used includes open air casting. However, PAS alloy wires formed by open air casting methods may have defects such as voids, inclusions, and segregation. For example, open air casting methods for making PAS alloy wires may include open air casting of the alloy with mechanical mixing followed by casting in a vertical book mold.

In an open air cast process, lead and tin were melted in a graphite crucible in an open atmosphere. The lead and tin mixture was 97.9% Pb and 2.1% Sn. In a separate crucible, silver was melted and then blended with the pre-molten Pb/Sn mixture. The mixture was heated to the melting point of silver (961.8° C.), mechanically mixed, and de-drossed. The final mixture was then cast in a book mold to form a bar 64.

The concentration of Ag and Sn of the bar 64 was taken at three locations along a length of the bar 64. As shown in FIG. 7, at a first location 66, the concentration of Ag was 1.64 wt. % and Sn was 1.55 wt. %. The balance 96.81 wt. % was Pb. At a second location 68, the concentration of Ag was 1.65 wt. %, Sn was 1.52 wt. %, and the balance was Pb. At a third location 70, the concentration of Ag was 1.36 wt. %, Sn was 1.49 wt. %, and the balance was Pb. As shown in FIG. 7, the components of the alloy segregated along the length of the comparison bar 64 to form localized areas having different concentrations than at other locations along the length.

Figure 8:
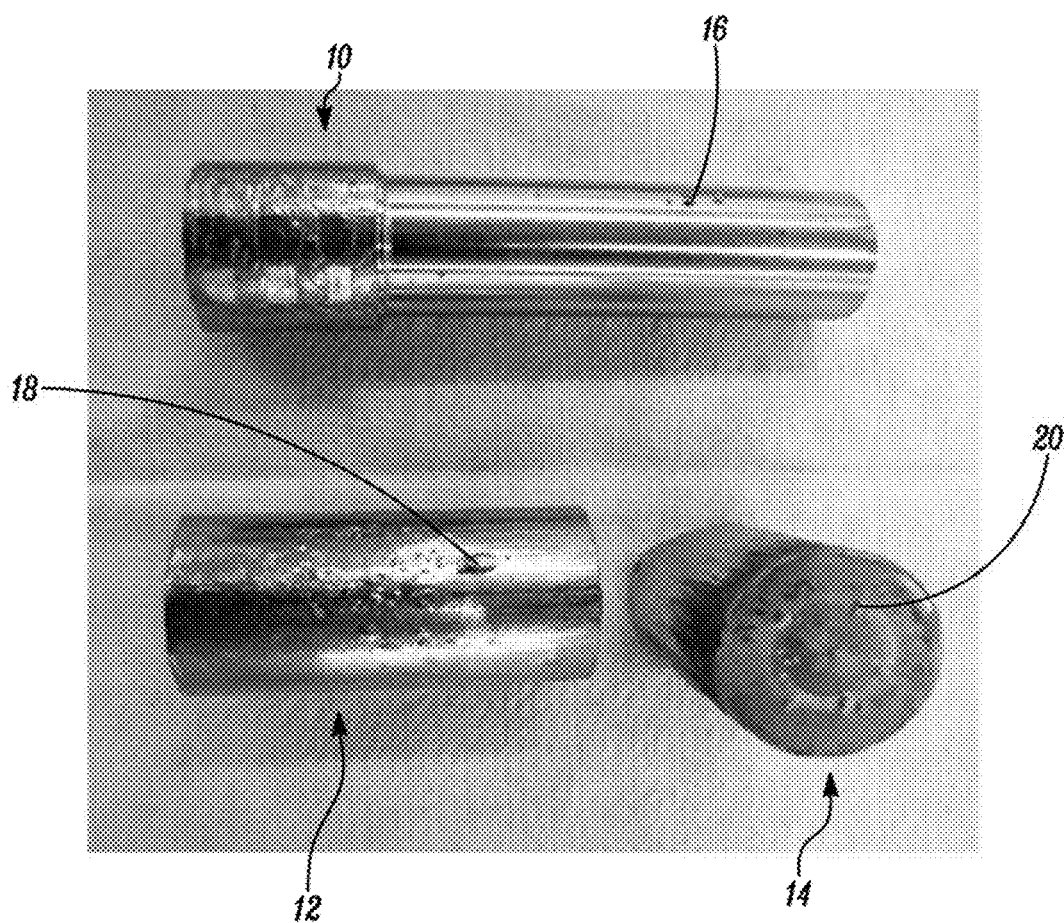
FIG. 8 is a photograph of a wire alloy bar formed using known methods.
Figure 9A:
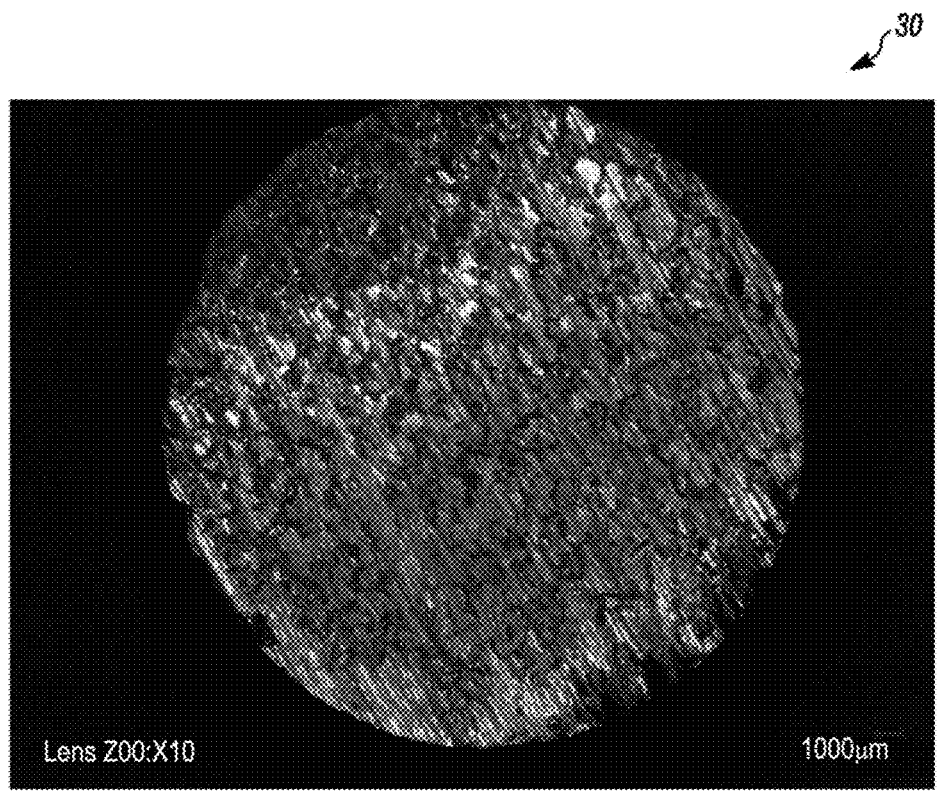
FIGS. 9A and 9B are digital microscope images of a wire alloy bar formed using known methods.
Figure 9B:
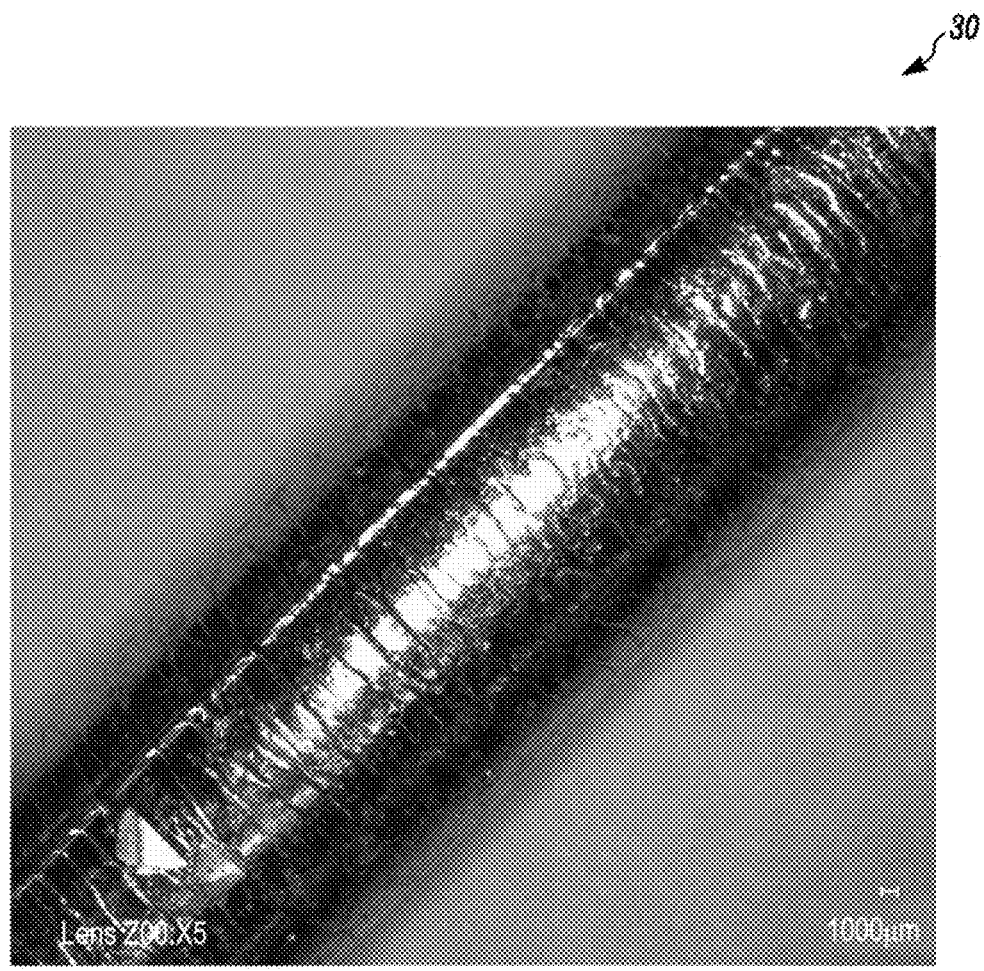

FIG. 8 is a photograph of wire alloy bars 10, 12, 14 made using open air casting. FIGS. 9A and 9B are digital microscope images of a wire alloy bar 30 made using open air casting. The alloy bars 10, 12, 14, 30 were cast from an alloy melt containing 95.5 wt. % Pb, 2.5 wt. % Ag, and 2.0 wt. % Sn. As shown in FIG. 8, bars 10, 12, 14 made using the open air casting method contain voids 16, 20 and blisters 18. Voids and blisters may decrease the strength of a wire later formed from the alloy bars 10, 12, 14. As shown in FIG. 9A the bar 30 made using the open air casting method contains voids. As shown in FIG. 9B the bar 30 made using the open air casting method contains surface defects.

The cast mixture was then extruded to form a fine wire having a diameter of 0.020 inches in a process similar to that described above for Example 1.

FIGS. 10, 11A, 11B, and 12 are photographs taken with a scanning electron microscope of a fine wire 40, 54 made with the wire alloy shown in FIGS. 8, 9A and 9B.

Figure 10:
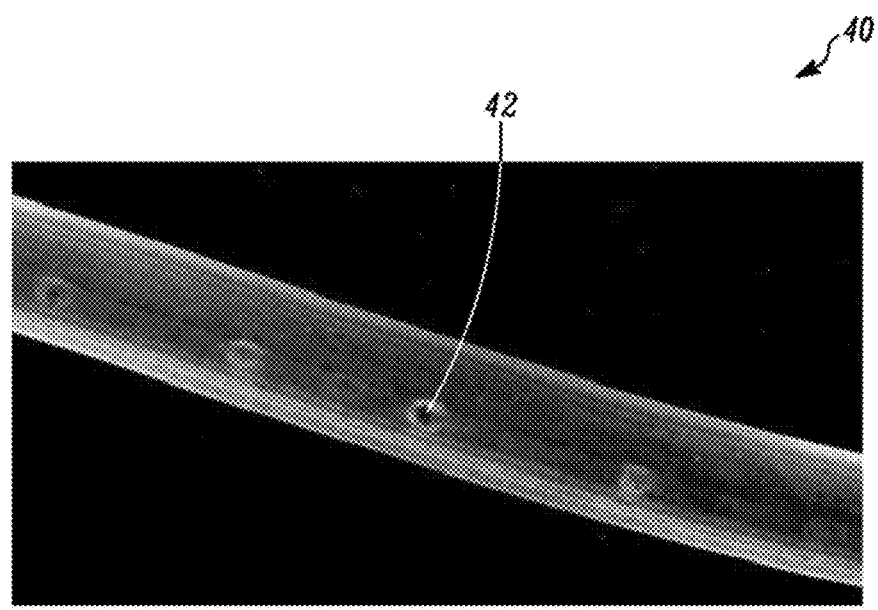
FIG. 10 is a high resolution secondary electron image taken with a scanning electron microscope of a wire formed using known methods.

As shown in FIG. 10, a fine wire 40 made using wire alloy that was cast using an open casting process and a book mold contains voids 42 in the wire alloy material. The voids 42 are visible in this photograph because they are at the surface of the fine wire 40. However, additional voids may also be present within the wire 40, i.e. below the surface. These voids 42 create problems such as wire breakage.

Figure 11A:
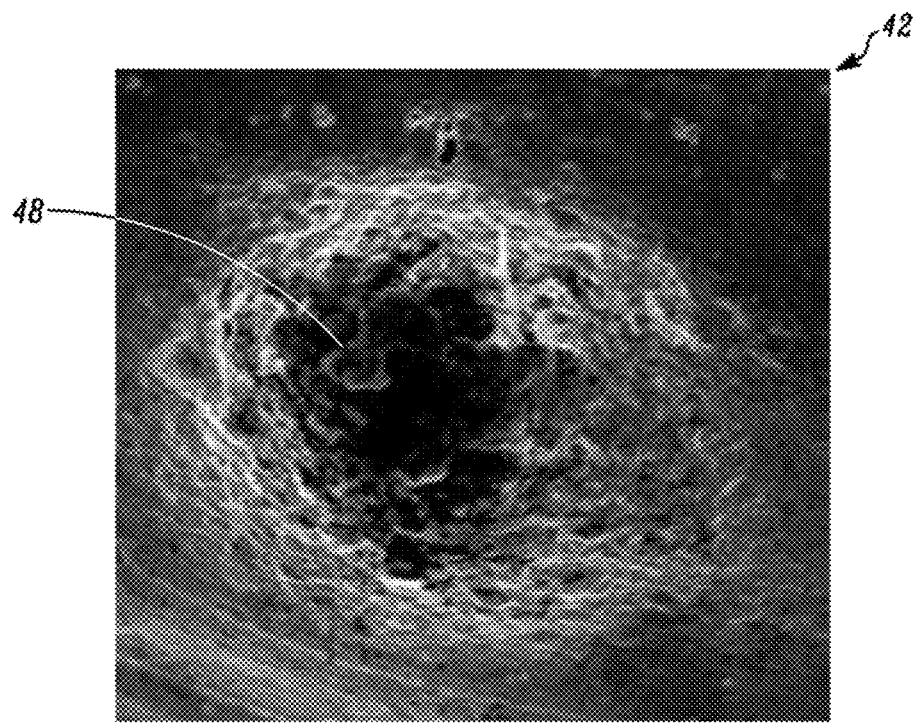
FIGS. 11A and 11B are high resolution secondary electron images taken with a scanning electron microscope of a wire formed using known methods.
Figure 11B:
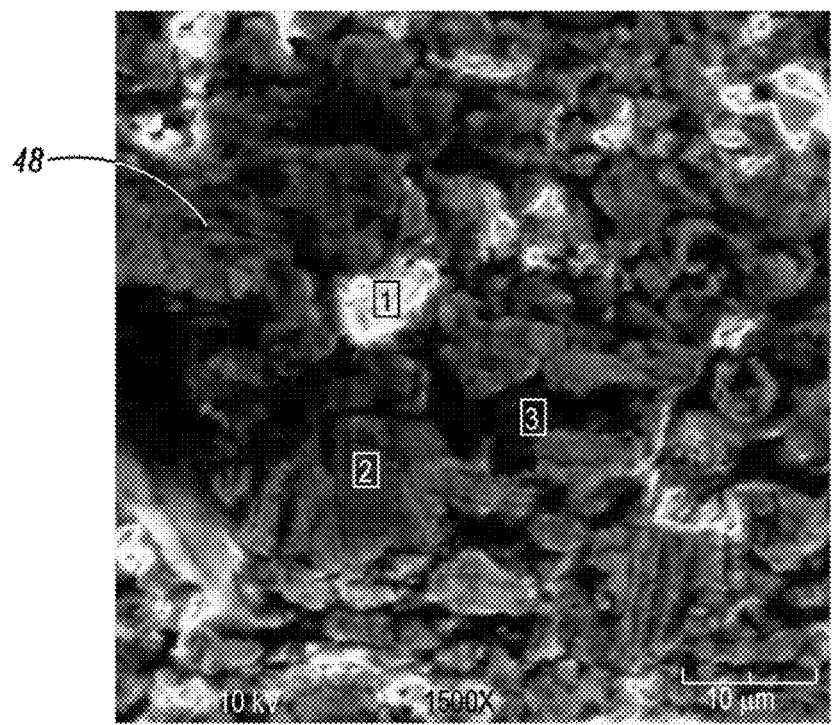

FIGS. 11A and 11B are photographs taken with a scanning electron microscope of the void 42 in FIG. 10 showing a close up view of the surface texture of the void 42. FIG. 11A is a close up of the entire void 42 shown in FIG. 10. FIG. 11B is an enhanced view of a portion 48 of the void 42 shown in FIG. 11A. As shown in FIG. 11B, the surface of the portion 48 of the void is uneven and has a surface texture that is granular, illustrating the alloy segregation.

Figure 12:
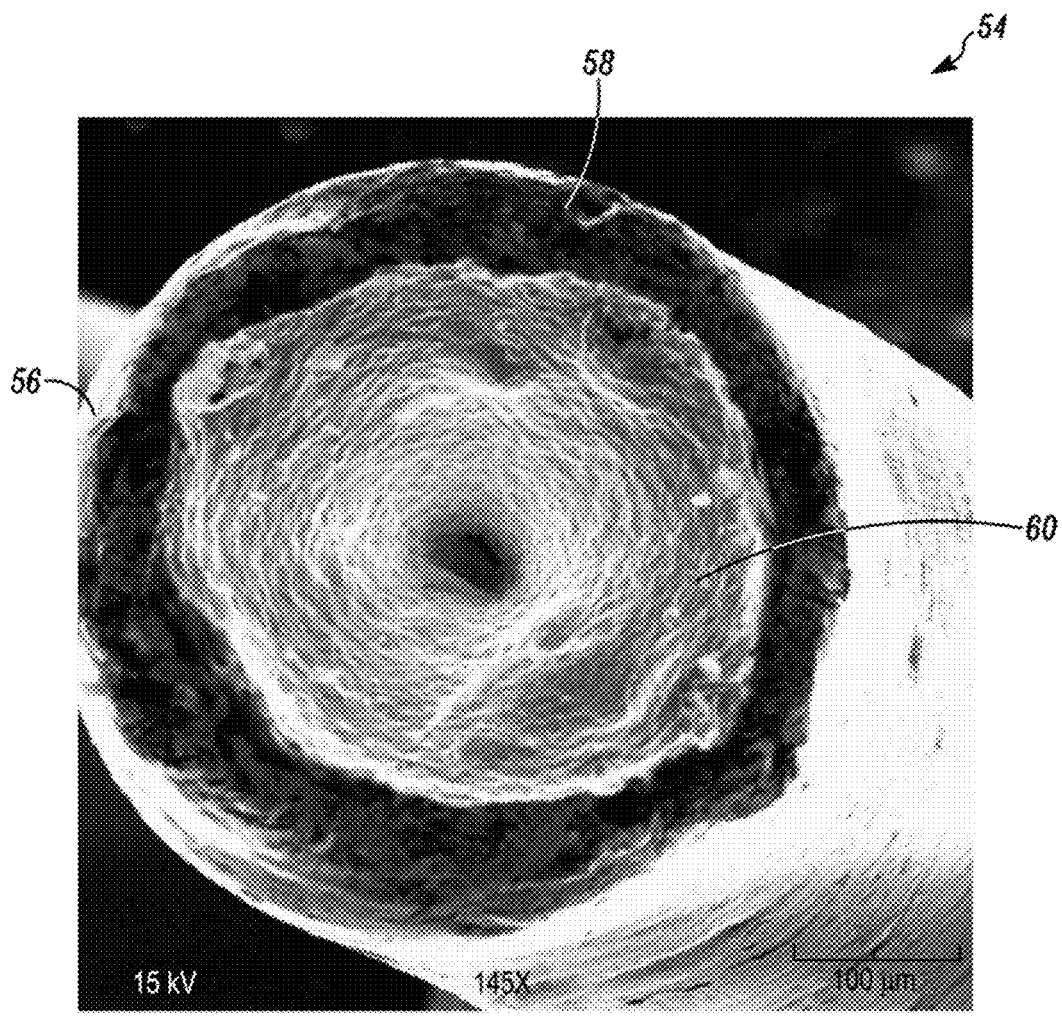
FIG. 12 is a high resolution secondary electron image taken with a scanning electron microscope of a wire formed using known methods.

FIG. 12 is a photograph taken with a scanning electron microscope of the cross sectional area of a fine wire 54 made with wire alloy that was cast using an open casting process and solidified in a book mold. Segregation is visible as the individual components have separated into concentric rings 56, 58, 60 of various shades of grey.

By comparison, using the methods disclosed herein, an alloy wire having improved bond strength and that is substantially free of these voids or inclusions may be formed. A metal wire formed using the methods disclosed herein has greater uniformity than the compared method above, and is thus less prone to breaking when compared to metal wires formed using open casting methods.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A method of forming an alloy material for use in a wire, the method comprising:
   forming a master alloy containing lead and silver;
   creating a molten wire alloy by combining the master alloy, additional lead, and tin in a vessel;
   flowing argon gas through and over the molten wire alloy;
   drawing the molten wire alloy from the vessel through an actively cooled die; and
   solidifying the molten wire alloy to form a bar of wire alloy containing from about 95.5 wt. % to about 97.5 wt. % lead, from about 1.5 wt. % to about 2.5 wt. % silver, and from about 1.0 wt. % to about 2.0 wt. % tin.

2. The method of claim 1, wherein creating the molten wire alloy further includes combining the master alloy, tin and a dopant.

3. The method of claim 1, wherein the wire alloy further includes a dopant selected from the group comprising phosphorus, calcium, and aluminum.

4. The method of claim 1, wherein the wire alloy has a melting point of about 310° C.

5. The method of claim 1, wherein the master alloy includes about 78.0 wt. % lead and about 22.0 wt. % silver.

6. The method of claim 1, wherein drawing the molten wire alloy includes cooling the molten wire alloy at a rate selected to form a uniform concentration of lead, silver, and tin throughout the wire alloy bar.

7. The method of claim 1, wherein drawing the molten wire alloy includes drawing the molten wire alloy through a die at a draw speed such that the wire alloy solidifies with a uniform concentration of the lead, the silver, and tin along a length and along a diameter of the wire alloy bar.

8. The method of claim 1, wherein the bar of wire alloy has a uniform concentration of the lead, the silver, and tin along a length and along a diameter of the wire alloy bar.

9. The method of claim 1, wherein the bar of wire alloy includes phosphorus at a concentration of from about 50.0 to about 200.0 parts per million.

10. A method of forming an alloy for use in a wire, the method comprising:

melting and combining a first metal and a second metal to form a master alloy, the first metal having a first melting point, the second metal having a second melting point and the master alloy having a melting point of from about 460° C. to about 650° C.;

forming a molten wire alloy by combining the master alloy with a third metal and an additional amount of at least one of the first metal and second metal;

mixing the molten wire alloy in a vessel containing argon gas; and cooling the molten wire alloy while drawing the molten wire alloy through a die to form a wire alloy bar;

wherein the first metal is lead, the second metal is silver, and the third metal is tin;

wherein the wire alloy bar contains from about 95.5 wt. % to about 97.5 wt. % lead, from about 1.5 wt. % to about 2.5 wt. % silver, and from about 1.0 wt. % to about 2.0 wt. % tin.

11. The method of claim 10, wherein cooling the molten wire alloy includes continuously casting the wire alloy.

12. The method of claim 10, wherein cooling the molten wire alloy includes continuously casting the wire alloy such that the wire alloy bar has a uniform concentration of each of the first metal, the second metal, and the third metal along a length and along a diameter of the wire alloy bar.

13. The method of claim 10, wherein mixing the wire alloy includes bubbling argon gas through the molten wire alloy.

14. The method of claim 10, wherein mixing the wire alloy includes bubbling the argon gas into the molten wire alloy and providing a layer of argon gas above a surface of the molten wire alloy.

15. The method of claim 10, wherein the wire alloy bar further contains from about 50.0 to about 200.0 parts per million phosphorus.

16. The method of claim 10, and further comprising extruding the wire alloy bar to form a wire having a diameter of from 0.254 micrometers to 1.270 micrometers.

17. The method of claim 10, wherein the wire alloy bar has a first end, a second end, and a diameter, and wherein the concentration of the first metal is the same at the first end, the second end, and at a location between the first end and the second end, and the concentration of the second metal is the same at the first end, the second end, and at a location between the first end and the second end.

* * * * *